United States Patent [19]

Ten Hoven

[11] Patent Number: 5,267,474
[45] Date of Patent: Dec. 7, 1993

[54] LIQUID-LEVEL SENSOR

[75] Inventor: James A. Ten Hoven, Sheboygan Falls, Wis.

[73] Assignee: Kohler Co., Kohler, Wis.

[21] Appl. No.: 965,582

[22] Filed: Oct. 23, 1992

[51] Int. Cl.$^5$ .................. G01F 23/00; G01F 23/28
[52] U.S. Cl. .................... 73/290 R; 73/290 V; 411/395; 403/83; 248/231.9; 340/618; 340/621
[58] Field of Search ............... 73/290 R, 290 V; 411/395, 383; 403/359, 83, 84, 103; 248/56, 231.9; 340/621, 618, 617

[56] References Cited

U.S. PATENT DOCUMENTS

| | | | |
|---|---|---|---|
| 2,496,402 | 2/1950 | McVeigh et al. | 248/56 |
| 2,501,581 | 3/1950 | Rieger | 403/103 |
| 2,616,004 | 10/1952 | Richards | 340/618 |
| 3,266,311 | 8/1966 | Andreasen et al. | 73/290 V |
| 3,825,025 | 7/1974 | Samuel et al. | 73/290 V |
| 3,851,333 | 11/1974 | Fishman | 73/290 V |
| 4,063,457 | 12/1977 | Zekulin et al. | 73/290 V |
| 4,130,018 | 12/1978 | Adams et al. | 73/290 V |
| 4,325,255 | 4/1982 | Howard et al. | 73/290 V |
| 4,325,416 | 4/1982 | Hermann | 73/290 V |
| 4,506,258 | 3/1985 | Charboneau et al. | 340/618 |
| 4,516,749 | 5/1985 | Sullivan | 248/56 |
| 4,540,981 | 9/1985 | Lapetina et al. | 73/290 V |
| 4,570,483 | 2/1986 | Sobue | 73/290 V |
| 4,601,182 | 7/1986 | Glanzmann | 403/359 |
| 4,785,663 | 11/1988 | Hermann | 340/621 |
| 4,909,080 | 3/1990 | Kikuta et al. | 73/290 V |
| 4,938,731 | 7/1990 | Nguyen et al. | 403/359 |
| 4,964,090 | 10/1990 | McCarthy | 73/290 V |

FOREIGN PATENT DOCUMENTS

| | | | |
|---|---|---|---|
| 3330063 | 2/1985 | Fed. Rep. of Germany | 73/290 V |
| 0205820 | 11/1983 | Japan | 73/290 V |
| 0004819 | 1/1985 | Japan | 73/290 V |
| 0271218 | 11/1990 | Japan | 73/290 V |
| 4-198722 | 7/1992 | Japan | 73/290 R |
| 1462113 | 1/1987 | U.S.S.R. | 73/290 V |

Primary Examiner—William A. Cuchlinski, Jr.
Assistant Examiner—Diego F. F. Gutierrez
Attorney, Agent, or Firm—Quarles & Brady

[57] ABSTRACT

A liquid level sensor has a liquid sensing element carried on the end of a curved probe which is inserted into a liquid-holding chamber. The probe can be rotated to properly locate the sensor within the chamber. A threaded nut locks the curved probe in position to maintain the sensor in the proper position.

9 Claims, 3 Drawing Sheets

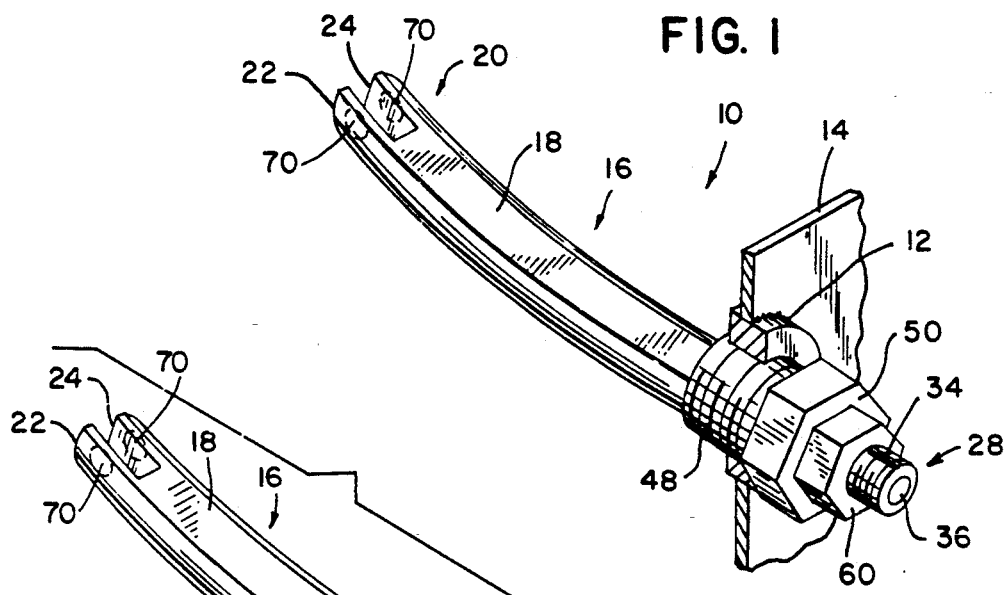
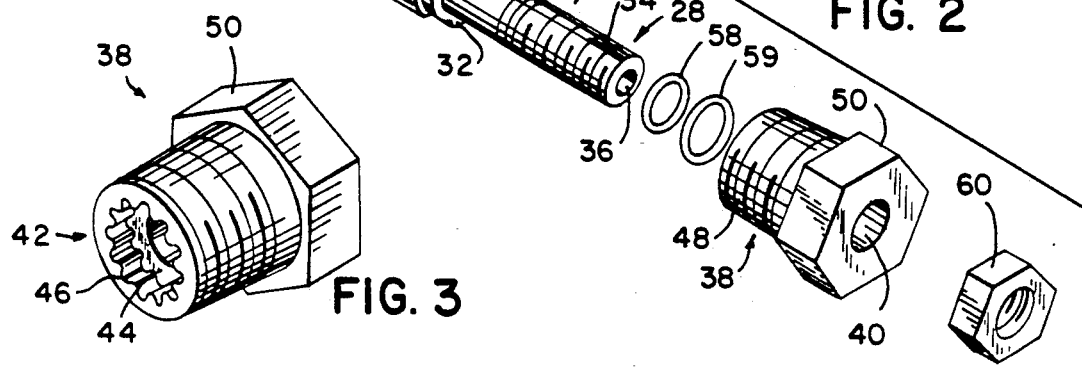
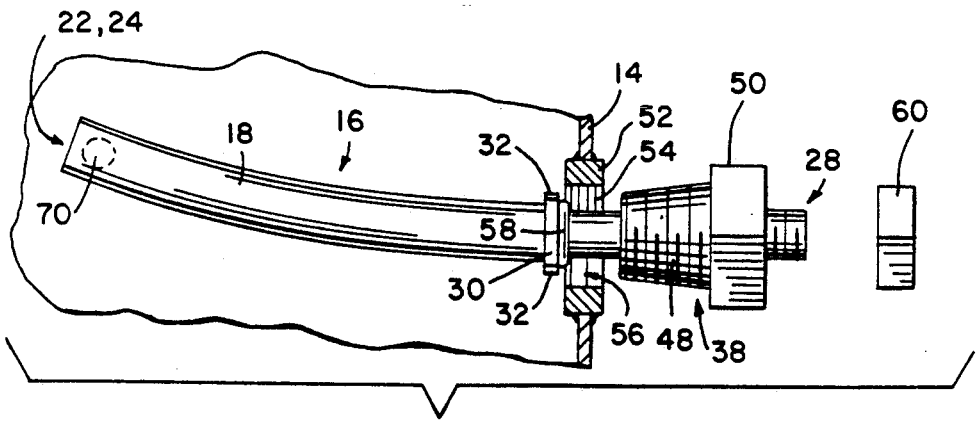

LIQUID-LEVEL SENSOR

BACKGROUND OF THE INVENTION

1. Field Of The Invention

The invention relates generally to probe-mounted sensors used to detect the level of a liquid in a chamber, such as oil in the crankcase of an engine. More particularly, the invention relates to an apparatus for mounting and orienting probe-mounted liquid-level sensing elements in a chamber.

2. Description Of The Art

It is known to detect liquid level by mounting sensing elements at the end of a probe inserted into a chamber containing a liquid. A common version employs two piezoelectric elements mounted with a space between them. An electrical voltage is applied to one element to cause it to vibrate ultrasonically. The vibration is transmitted through the space to the other piezoelectric element, causing it to vibrate and thereby generate a voltage. If the space between the members is filled with a liquid, the vibration will be transmitted more efficiently than if it is filled with air or another gas. A circuit measures the voltage level produced by the receiving piezoelectric element and, if the voltage level indicates the absence of the fluid in the space, produces a display, sounds an alarm or causes some other action such as shutting down the engine. Examples of such devices are found in U.S. Pat. Nos. 3,825,025, 3,851,333 and 4,964,090.

Sensing elements other than piezoelectric may also be employed. For example, analogous devices can be devised using optical transmission or electrical conduction through the space between a pair of optical elements or a pair of electrical terminals respectively to detect the presence of a liquid at the end of the probe. Alternatively, the sensing element could consist of a float mounted at the end of the probe whose movement makes and breaks an electrical circuit.

Such devices have posed a locational problem and an orientation problem. The locational problem arises because prior art devices employ a straight probe. Because the probe is straight, the opening for it in the wall of the chamber dictates the position of the probe mounting hole in the chamber wall, and that position may be undesirable for manufacturing or installation purposes. The orientation problem is that proper operation of the sensing elements often requires a particular rotational orientation of the probe. For example, with ultrasonic sensors, the ultrasonic vibration is best transmitted horizontally rather than vertically for proper measurement. If a float is used, the probe must be oriented so that the float is free to move vertically. In known devices, it is difficult to easily set and fix the correct rotational position of the probe. In those devices, the probe is directly threaded into an aperture in the chamber wall. Variations in relative thread alignment, in starting positions and in degree of tightening make it difficult to correctly orient the elements at the end of the probe.

SUMMARY OF THE INVENTION

The invention provides an improvement in liquid level sensors of the type in which sensing elements are mounted on the end of a probe inserted into a chamber containing liquid.

In one aspect, the invention provides a sensor wherein the longitudinal axis of the portion of the probe inside the chamber diverges from the longitudinal axis of the probe at the point of entry into the chamber. For example, the probe may bend or curve inside the chamber, with the result that the sensing elements at the end of the probe are located at a different elevation or relative horizontal position than the chamber opening. Because the probe is bent or curved, the mounting hole in the chamber wall can be located to facilitate convenience and ease of installation. The sensing elements may be located higher or lower, or more to the front or more to the back, than the aperture in the wall of the chamber simply by rotating the probe in the mounting hole.

In another aspect, the invention provides a sensor with an improved means for fixing the rotational position of the probe inside the chamber. A reciprocal locking means is provided which has one element affixed to the probe and another element affixed to the chamber wall. Means operable from outside the chamber are provided to rotate the probe to the proper position and to fix it into that position by holding the reciprocal locking means in locking engagement. This ensures that the position is not dependent on variations in the threading or tightening of the mounting to the chamber wall. Rather, the installer can easily rotate the probe from the outside of the chamber, determine that it is in the correct position and lock it into that position. Thus, installation is made easier and quicker and therefore less expensive.

These and other objects and advantages of the invention will be apparent from the description which follows. The preferred embodiments will be described in reference to the accompanying drawings. These embodiments do not represent the full scope of the invention, but rather the invention may be employed in other embodiments. Reference should therefore be made to the claims herein for interpreting the breadth of the invention.

BRIEF DESCRIPTION OF THE DRAWINGS

FIG. 1 is a perspective view of a sensor embodying the present invention mounted in an aperture in the wall of a chamber;

FIG. 2 is an exploded perspective view of the sensor of FIG. 1;

FIG. 3 is a perspective view of the conduit component of the sensor of FIGS. 1 and 2.

FIG. 4 is a side elevational view of a partially assembled sensor;

DESCRIPTION OF THE PREFERRED EMBODIMENT

Figure 5:
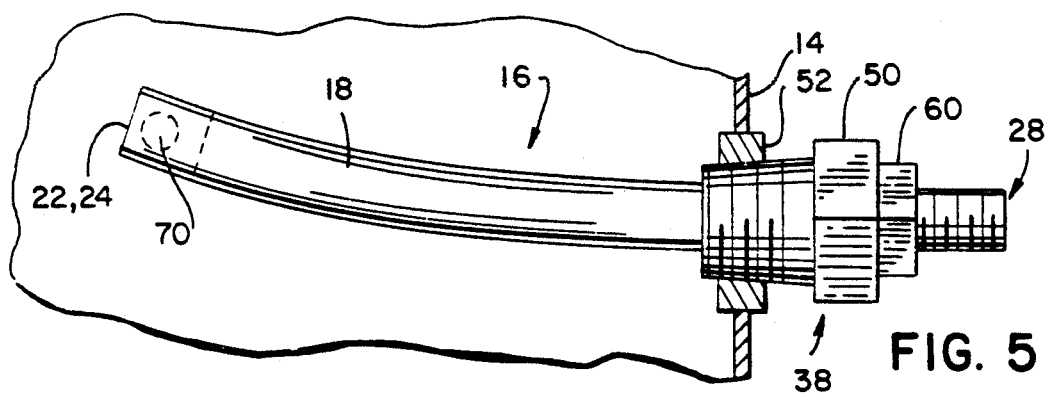
FIG. 5 is similar to FIG. 4, but shows the sensor fully assembled and mounted.
Figure 6:
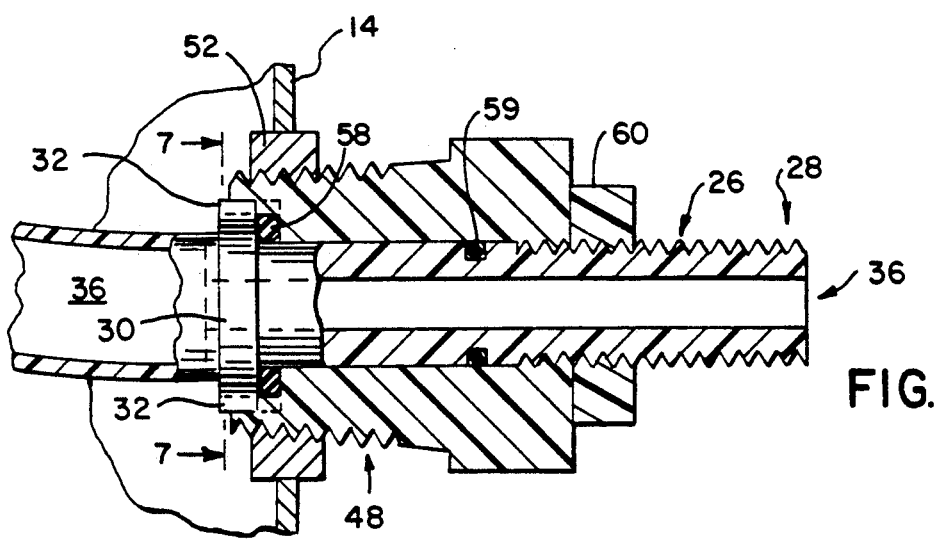
FIG. 6 is an enlarged cross-sectional view of the mounting and locking components of the sensor of FIG. 1.

FIG. 1 shows liquid sensor 10 mounted in and through an aperture 12 in wall 14 of a tank containing a liquid. As most clearly shown in FIG. 2, the primary element of the sensor 10 is a probe 16 formed as an integral unit from plastic or nylon by injection molding. The probe 16 includes a curved, elongated inboard portion 18 which supports a bifurcated inboard end 20. Sensing elements 70 are mounted in prongs 22 and 24 formed on the inboard end 20 of probe 16. A threaded shaft 26 is formed on the other end of the probe 16 culminating in an outboard end 28. At its junction with inboard portion 18, threaded shaft 26 is enlarged by ring 30 having two diametrically opposed lobes 32, which comprise one element of a reciprocating locking mechanism. Shaft 26 has a circumferential groove 33 which, as will be seen below, accepts a sealing O-ring. Near the outboard end 28 a position marker 34 is formed on the outer surface of shaft 26. Its position on shaft 26 corresponds to a certain orientation of inboard portion 18 of probe 16. Probe 16 has an internal passageway 36 for electrical conductors (not shown) for connecting the sensing elements with a voltage source and circuitry external to the chamber.

Figure 7:
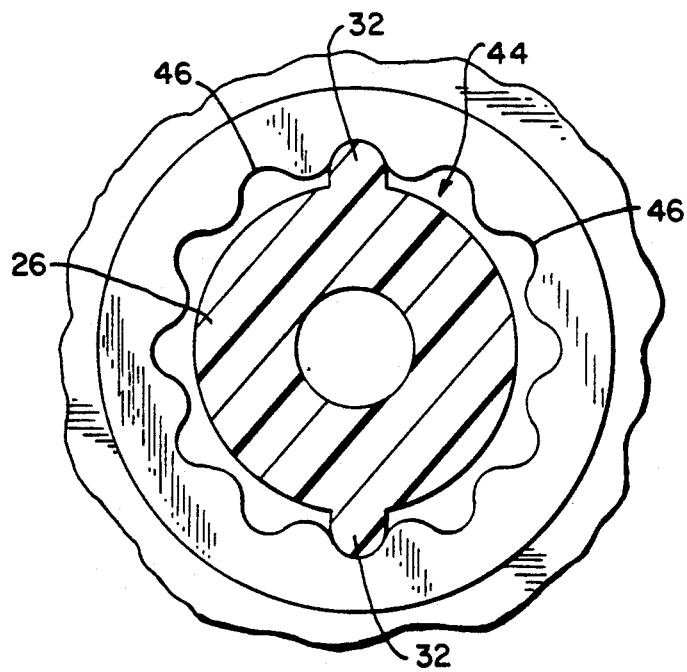
FIG. 7 is a sectional view taken along plane 7—7 of FIG. 6.

Another element of sensor 10 is a bushing 38, which is formed of molded plastic or sintered metal and is slidably received on the shaft 26 of the probe 16. As shown most clearly in FIGS. 2, 3 and 7, bushing 38 has an internal passageway 40 which is of sufficient diameter to allow shaft 26 to slidably pass through it, and a shaped cavity 42 is formed around passageway 40 on the inner end of bushing 38. The end of cavity 42 is abutment 44 which, as will be seen, cooperates in sealing the chamber. The cavity 42 has twelve radially extending notches 46 which cooperate with the radially extending lobes 32 on the probe 16 and which form a second element of the reciprocating locking mechanism. A tapered thread 48 is formed on the outer surface of the bushing 38 at its inner end, and a hexagonal lug 50 is formed on its outer end.

The last major element of the sensor 10 is an annular threaded fitting 52 affixed in aperture 12 of chamber wall 14. Its threaded surface 54, which defines opening 56, is tapered to receive tapered thread 48 of bushing 38.

Assembly and installation of sensor 10 proceeds as follows. Probe shaft 26 is slidably inserted through O-rings 58 and 59 and through the passageway 40 of bushing 38. O-ring 58 is moved adjacent to ring 30, and O-ring 59 is placed in groove 33. The inboard end 20 of probe 16 is inserted through the opening 56 in the threaded fitting 52. Bushing 38 is screwed into the threaded fitting 52 of wall aperture 12, and the outboard end 28 of probe shaft 26 is rotated so that the orientation marker 34 is in the position which indicates that inboard portion 18 of probe 16 is correctly oriented within the chamber. Outboard end 28 is then pulled so that O-ring 58 is tightly engaged against abutment 44, and lobes 32 on probe 16 lockably engage two of the notches 46 of bushing 38. A threaded jam nut 60 is then fastened to shaft 26. When jam nut 60 is tightened against the bushing 38, O-ring 58 is compressed between ring 30 and against abutment 44, and lobes 32 and notches 46 are fixed in locking alignment. O-ring 58 provides a liquid seal between the interior and exterior of the chamber. O-ring 59 in groove 33 provides a continuous seal between the outside of shaft 26 and passageway 40 of bushing 38 and thereby enables adjustments to be made when the chamber is filled with liquid.

Referring to FIG. 1, probe 16 is perpendicular to the chamber wall 14 at the point of entry through fitting 52, but its inboard portion 18 curves, thereby locating the sensing elements in prongs 22 and 24 at a higher elevation than that of aperture 12. It will be recognized that, by loosening jam nut 60 and rotating outboard end 28 of probe 16, lobes 32 may be rotated to engage different notches 46 on the bushing 38. The sensing elements can thus be rotated and locked in different orientations which locate them at different elevations and horizontal offsets from aperture 12. Orientation marker 34 on probe 16 indicates the orientation of inboard portion 18 of probe 16. Thus, the position of the sensing elements in the chamber can readily be determined and fixed from outside of the chamber.

Figure 8:
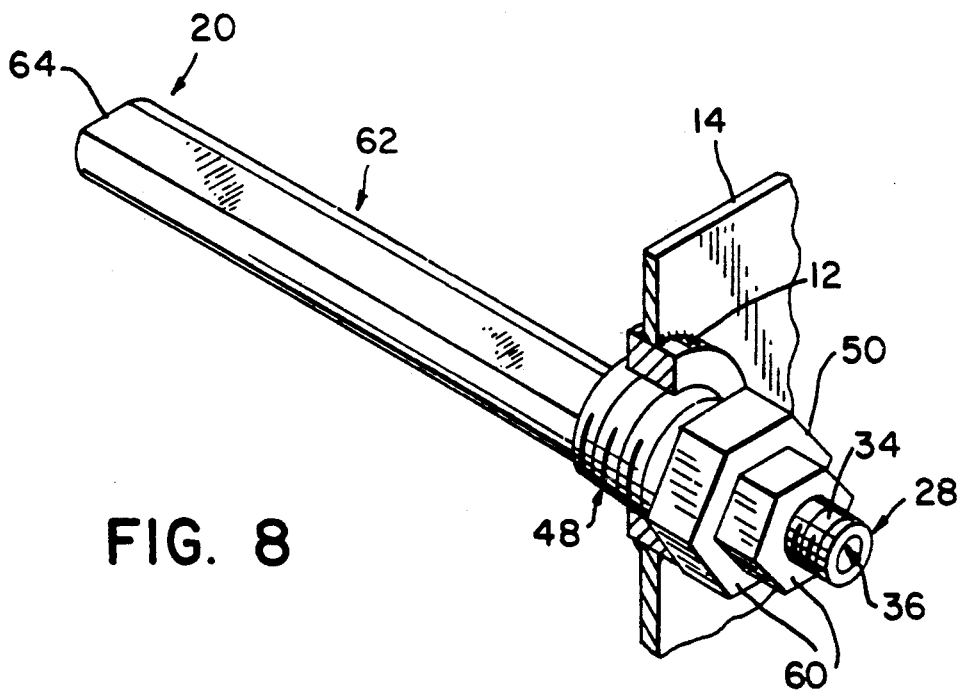
FIG. 8 is a perspective view of an embodiment like that of FIGS. 1-7 except that the probe is straight and does not have a forked end.

FIG. 8 shows another embodiment employing the reciprocal locking means described above but having a straight probe 62 and a probe inboard end 64 which is not bifurcated. A straight probe 62 may be used where the location of the chamber wall opening dictated by the required position of the sensing element is not disadvantageous. A solitary inboard probe end 64 might be used to house or attach a float-type sensing element.

Although the preferred embodiments of the invention have been described above, there may be various other embodiments which are within the scope of the invention. For example, the lobes 32 could be in shaped cavity 42 of busing 38 and notches 46 could be on shaft 26. There could be more or fewer lobes and/or notches. Other reciprocal locking arrangements could also be employed. The inboard portion 18 of probe 16 may be angled rather than curved or may have some other shape such as that of a crank. Thus, the invention is not to be limited by the specific description above, but should be judged by the claims which follow.

I claim:

1. A sensor for detecting liquid level in a chamber, comprising:
   (a) mounting means fastened to a chamber wall and providing an aperture;
   (b) a probe extending into the chamber through the aperture;
   (c) a liquid sensing element affixed to the probe within the chamber; and
   (d) a reciprocal non-threadably locking means, having a first element affixed to the probe and a second element affixed to the mounting means, and means operable from outside of the chamber for holding the probe in locked engagement with the mounting means, wherein the rotational orientation of the probe within the aperture is fixed by engagement of the first and second elements.

2. The sensor as recited in claim 1 in which the probe has an inboard portion which is not perpendicular to the chamber wall so that rotation of the probe with respect to the mounting means varies the position of the liquid sensing element with respect to the aperture.

3. The sensor as recited in claim 2 in which the inboard portion is curved.

4. The sensor as recited in claim 1 in which a mark is formed on the probe for indicating the rotational position of the probe in the chamber.

5. The sensor as recited in claim 1 in which the first element of the reciprocal locking means includes a lobe which extends radially outward from the probe and the second element includes a set of notches disposed around the aperture.

6. The sensor as recited in claim 1 in which the means for holding includes a jam nut which is received on a threaded outboard end of the probe.

7. The sensor as recited in claim 1 in which the mounting means includes a fitting fastened to the chamber wall and an externally threaded bushing which is received in a threaded opening in the fitting.

8. The sensor as recited in claim 1 further comprising a first resilient ring mounted on the probe adjacent the first element and the second element of the reciprocal locking means so as to provide a first seal between an interior and an exterior of the chamber.

9. The sensor as recited in claim 8 in which there is a groove in the outer surface of the probe and further comprising a second resilient ring mounted in the groove so as to provide a second seal between the outside probe and the aperture of the mounting means.

* * * * *

UNITED STATES PATENT AND TRADEMARK OFFICE
CERTIFICATE OF CORRECTION

PATENT NO. : 5,267,474

DATED : December 7, 1993

INVENTOR(S) : James A. Ten Hoven

It is certified that error appears in the above-identified patent and that said Letters Patent is hereby corrected as shown below:

In claim 9, at the last line of column 6, the words - - of the - - should be inserted between "outside" and "probe."

Signed and Sealed this

Seventeenth Day of May, 1994

*Attest:*

BRUCE LEHMAN

*Attesting Officer*  *Commissioner of Patents and Trademarks*